United States Patent
Ma et al.

(10) Patent No.: US 8,030,909 B2
(45) Date of Patent: Oct. 4, 2011

(54) METHOD AND APPARATUS FOR SWITCHING A SYNCHRONOUS DC/DC CONVERTER BETWEEN A PWM MODE OF OPERATION AND A LIGHT-LOAD MODE OF OPERATION

(75) Inventors: Fei Ma, Lexington, MA (US); Jin-Biao Huang, Amherst, NH (US); Brian Thomas Lynch, Brookline, NH (US)

(73) Assignee: Texas Instruments Incorporated, Dallas, TX (US)

( * ) Notice: Subject to any disclaimer, the term of this patent is extended or adjusted under 35 U.S.C. 154(b) by 447 days.

(21) Appl. No.: 12/360,668

(22) Filed: Jan. 27, 2009

(65) Prior Publication Data

US 2010/0188061 A1 Jul. 29, 2010

(51) Int. Cl.
*G05F 1/59* (2006.01)

(52) U.S. Cl. ........................................ 323/271; 323/284

(58) Field of Classification Search .................. 323/271, 323/283, 284
See application file for complete search history.

(56) References Cited

U.S. PATENT DOCUMENTS

| | | | |
|---|---|---|---|
| 6,949,917 B2 * | 9/2005 | Umemoto et al. | 323/286 |
| 7,245,113 B2 * | 7/2007 | Chen et al. | 323/271 |
| 7,652,945 B2 * | 1/2010 | Chu et al. | 365/226 |
| 7,755,342 B2 * | 7/2010 | Chen et al. | 323/283 |
| 2004/0051510 A1 * | 3/2004 | Saggini et al. | 323/282 |
| 2007/0159151 A1 * | 7/2007 | Katoh et al. | 323/285 |
| 2008/0042709 A1 * | 2/2008 | Chen et al. | 327/175 |
| 2008/0129263 A1 * | 6/2008 | Kotikalapoodi et al. | 323/283 |
| 2010/0052628 A1 * | 3/2010 | Khayat et al. | 323/234 |
| 2010/0188061 A1 * | 7/2010 | Ma et al. | 323/247 |

OTHER PUBLICATIONS

U.S. Appl. No. 12/199,012, filed Aug. 27, 2008, entitled "Circuit and Method for Reducing Output Voltage Transients in a Voltage Mode Buck Converter.".

* cited by examiner

*Primary Examiner* — Jeffrey Sterrett
(74) *Attorney, Agent, or Firm* — John J. Patti; Wade J. Brady, III; Frederick J. Telecky, Jr.

(57) ABSTRACT

A synchronous buck converter operates in a PWM mode of operation and switches to light-load mode of operation under a light-load condition. When operating in the light-load mode, the synchronous buck converter transitions between a burst mode and an idle mode of operation. In the burst mode of operation, the converter operates with a fixed but increased duty ratio, with respect to the PWM mode of operation, that installs additional energy in an output capacitor. In the idle mode of operation, the high-side and low-side transistors are each turned off. To maximize energy savings and to quickly transition back to the PWM mode of operation if the load increases, a limit as to the number of allowed switching cycles when bursting is imposed and a minimum ratio of the number of clock cycles when idling to the number of switching cycles when bursting is set. Additionally, a comparator is provided to detect a sudden step-increase in the load to quickly switch the converter back to the PWM mode of operation.

18 Claims, 3 Drawing Sheets

METHOD AND APPARATUS FOR SWITCHING A SYNCHRONOUS DC/DC CONVERTER BETWEEN A PWM MODE OF OPERATION AND A LIGHT-LOAD MODE OF OPERATION

FIELD OF THE INVENTION

The present invention relates generally to operating a synchronous DC/DC voltage converter in an energy-saving mode under light-load conditions

BACKGROUND OF THE INVENTION

As is known, a step-down DC/DC converter receives an input DC voltage and converts it to an output DC voltage. This type of converter is often referred to as a buck converter. A buck converter usually has an efficiency of up to 95% for integrated circuits and is self-regulating making it very useful for providing power in devices such as laptop computers where a relatively large DC voltage, in the range of 12 to 24 volts, is converted down to the few volts used by the devices in the computer system.

The operation of a synchronous buck converter is well known in the art and may be described, very simply, as being implemented with a buck controller, an inductor and two transistors: a high-side transistor and a low-side transistor. The controller alternately turns the transistors off and on to alternately connect the inductor to the source voltage to store energy in the inductor or to discharge the inductor into a load. The transistors operate with a fixed duty cycle D where the low-side transistor is turned on for a 1-D portion of each period.

The operation of such a synchronous buck converter, however, requires that the controller driving the transistors operate such that both transistors are not turned on at the same time. This is accomplished by known control circuitry using a pulse width modulated (PWM) signal to control the transistors.

While it may be known to shut down the operation of the synchronous buck converter when there is no load or the load drops below a certain threshold, the response time of the buck converter to come back to full operation mode, when the load does increase, may be unacceptable and, therefore, compromise performance.

SUMMARY OF THE INVENTION

An embodiment of the invention, accordingly, provides a method of operating a synchronous DC/DC converter. The method comprises operating in a light-load mode of operation by alternately operating in a burst mode and an idle mode; incrementing a burst count value by one for each clock cycle during burst mode; comparing the burst count value to a predetermined burst threshold value; and ceasing operation of the synchronous DC/DC converter in the light-load mode of operation if the burst threshold value is less than the burst count value.

In accordance with an embodiment of the invention, the method further comprises the step of decrementing the burst count value by one for each clock cycle during idle mode.

In accordance with an embodiment of the invention, the method further comprises the steps of incrementing an idle count value by one for each clock cycle during idle mode; comparing a ratio of the idle count value to the burst count value to a predetermined threshold; and ceasing operation of the synchronous DC/DC converter in the light-load mode of operation if the ratio is less than the predetermined threshold.

In accordance with an embodiment of the invention, the burst threshold value is 7.

In accordance with an embodiment of the invention, a synchronous DC/DC controller is provided. The controller comprises an amplifier having a plurality of input terminals, and an output terminal; an analog-to-digital-to-analog converter (ADAC) that is coupled to the output terminal of the amplifier; a first multiplexer that is coupled to the output terminal of the amplifier, a feedback node, and at least one of the input terminals of the amplifier; a second multiplexer that is coupled to the ADAC reference node, and at least one of the input terminals of the amplifier; a voltage margin circuit coupled to the output terminal of the amplifier; a comparator that is coupled to the voltage margin circuit and that compares an output signal from the voltage margin circuit to a reference voltage; and a Light-load Efficiency (LLE) controller coupled to the first and second multiplexers, the ADAC, and the voltage margin circuit, wherein the LLE controller provides control signals to the first and the second multiplexers to set the amplifier as a unity gain amplifier during an LLE mode of operation.

In accordance with an embodiment of the invention, the voltage margin circuit further comprises a voltage margin generator that is coupled to the output terminal of the amplifier; and a switch coupled in parallel with the voltage margin generator.

In accordance with an embodiment of the invention, the voltage margin circuit further comprises an adder that is coupled to the output terminal of the amplifier; and a voltage margin generator that is coupled to the adder.

In accordance with an embodiment of the invention, the controller further comprises a detection circuit that is adapted to detect reverse inductor currents.

In accordance with an embodiment of the invention, the LLE controller further comprises a counter that is coupled to the detection circuit, wherein the counter maintains a burst count; and LLE control logic that is coupled to the counter, wherein the LLE control logic provides the control signals to the first and second multiplexers.

In accordance with an embodiment of the invention, the detection circuitry further comprises a zero-crossing detection that is adapted to detect reverse inductor currents; and a peak/valley detector that is coupled to the feedback node.

In accordance with an embodiment of the invention, the controller further comprises a PWM logic that is coupled to the comparator.

In accordance with an embodiment of the invention, an apparatus is provided. The apparatus comprises a bridge coupled between an input voltage and ground; an inductor having a first and a second terminal, wherein the inductor is coupled to the bridge at its first terminal and an output node at its second terminal; a capacitor coupled between the output terminal and ground; a feedback network coupled to the output node; and a controller coupled to the feedback network and to the bridge, wherein the controller provides driving signals to the bridge. The controller includes an amplifier having a plurality of input terminals, and an output terminal; an ADAC that is coupled to the output terminal of the amplifier; a first multiplexer that is coupled to the output terminal of the amplifier a feedback node, and at least one of the input terminals of the amplifier; a second multiplexer that is coupled the ADAC reference node, and at least one of the input terminals of the amplifier; a voltage margin circuit coupled to the output terminal of the amplifier; a comparator that is coupled to the voltage margin circuit and that compares an output signal from the voltage margin circuit to a reference voltage; and a Light-load Efficiency (LLE) controller coupled to the first and second multiplexers, the ADAC, and the voltage margin circuit, wherein the LLE controller provides control signals to the first and the second multiplexers to set the amplifier as a unity gain amplifier during an LLE mode of operation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Various aspects of at least one embodiment of the invention are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purpose of illustration and explanation and is not intended as a definition of the limits of the invention. In the figures.

DETAILED DESCRIPTION

It is to be appreciated that embodiments of the methods and apparatuses discussed herein are not limited in application to the details of construction and the arrangement of components set forth in the following description or illustrated in the accompanying drawings.

As discussed below, the invention provides a synchronous "buck" DC/DC converter with a controller that switches between a Pulse Width Modulation (PWM) mode of operation and an energy-saving or Light-load Efficiency (LLE) mode of operation. When a light-load condition is detected, the controller switches the synchronous buck DC/DC converter from the PWM mode of operation to the LLE mode of operation. The LLE mode of operation employs peak-valley control, i.e., maintaining output voltage in a predetermined range of values, and is a combination of a burst or "bursting" mode of operation and an idle or "idling" mode of operation. As will be described below, extra energy is installed in an output capacitor when bursting and is then used to support the load when idling where both of the high-side and low-side transistors are turned off. Advantageously, by reducing the overall switching loss and conduction loss, the efficiency of the DC/DC converter is increased and energy is saved.

Figure 1:
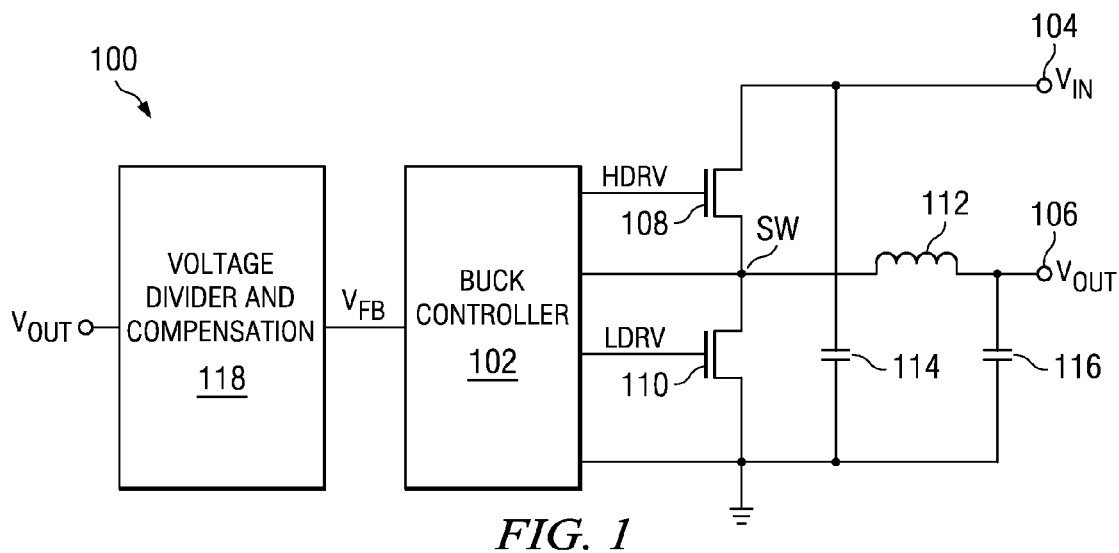
FIG. 1 is a schematic diagram of a system in accordance with an embodiment of the invention.

Referring now to FIG. 1, a synchronous DC/DC converter system 100 includes a buck controller 102 coupled to an input voltage node 104 and an output voltage node 106. The input voltage node 104 receives an input voltage Vin and the output voltage node 106 provides the regulated output node Vout. A high-side transistor 110 is positioned between the input voltage node 104 and a switch node SW. A low-side transistor 110 is positioned between the switch node SW and ground. An inductor 112 is positioned between the switch node SW and the output voltage node 106. A holding capacitor 114 is positioned between the output voltage node 104 and ground and an output capacitor 116 is coupled between the output voltage node 106 and ground. Together transistors 100 and 110 form a switching bridge.

Similar to known DC/DC converters, the high-side transistor 108 is driven by the buck controller 102 with a high-side drive signal HDRV and the low-side transistor 110 is driven by the buck controller 102 with a low-side drive signal LDRV. In order to provide a signal reference, the buck controller 102 is also coupled to ground. Further, the output voltage $V_{out}$ from the output voltage node 106 is fed-back through a voltage divider/compensation module or feedback network 118 to provide a feedback signal to feedback node VFB used in operation of the converter and which will be referenced and further described below.

Figure 2:
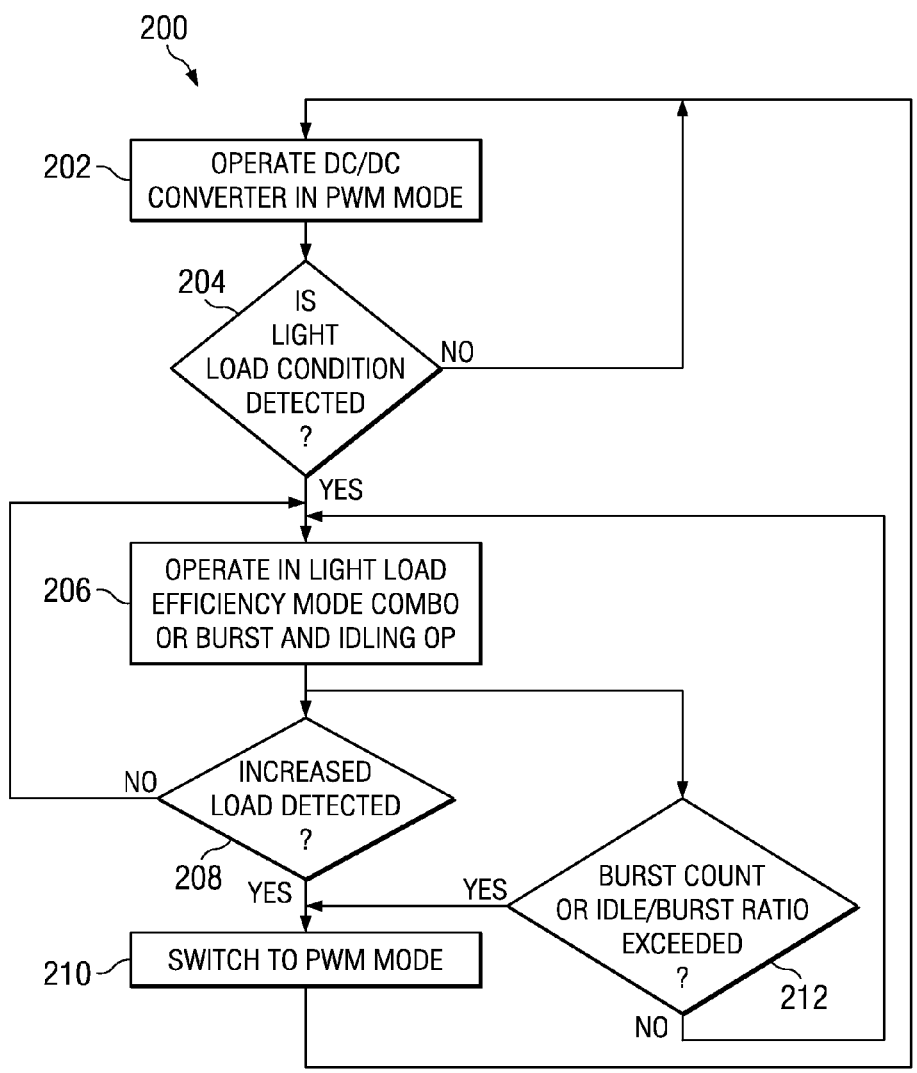
FIG. 2 is a flowchart in accordance with an embodiment of the invention.

Referring now to FIG. 2, in an embodiment of the invention, and as an overview, a method 200 of operation will now be discussed. Initially, at step 202, the DC/DC converter is operating in the PWM mode of operation. At step 204 a determination is made as to whether or not a light-load condition has been detected. If no light-load condition has been detected then control passes back to step 202. If, on the other hand, a light-load condition is detected at step 204, control passes to step 206 where the operation of the DC/DC converter switches to a Light-load Efficiency (LLE) mode of operation which is a combination, as will be discussed in more detail below, of a burst and an idle modes of operation. Once in the LLE mode of operation, if an increase in the load current being drawn is detected, step 208, then control is passed to step 210 where operation of the DC/DC converter is switched back to the PWM mode of operation and control also then returns to step 202. In step 212 it is determined whether or not a number of burst cycles or a ratio of burst cycles to idle cycles (burst:idle) has exceeded a respective predetermined threshold value. If either condition is true, then control passes to step 210 where operation returns to the PWM mode and control reverts to step 202. If, however, the number of burst cycles and the burst:idle ratio do not exceed their respective thresholds then control passes back to step 206.

Figure 3:
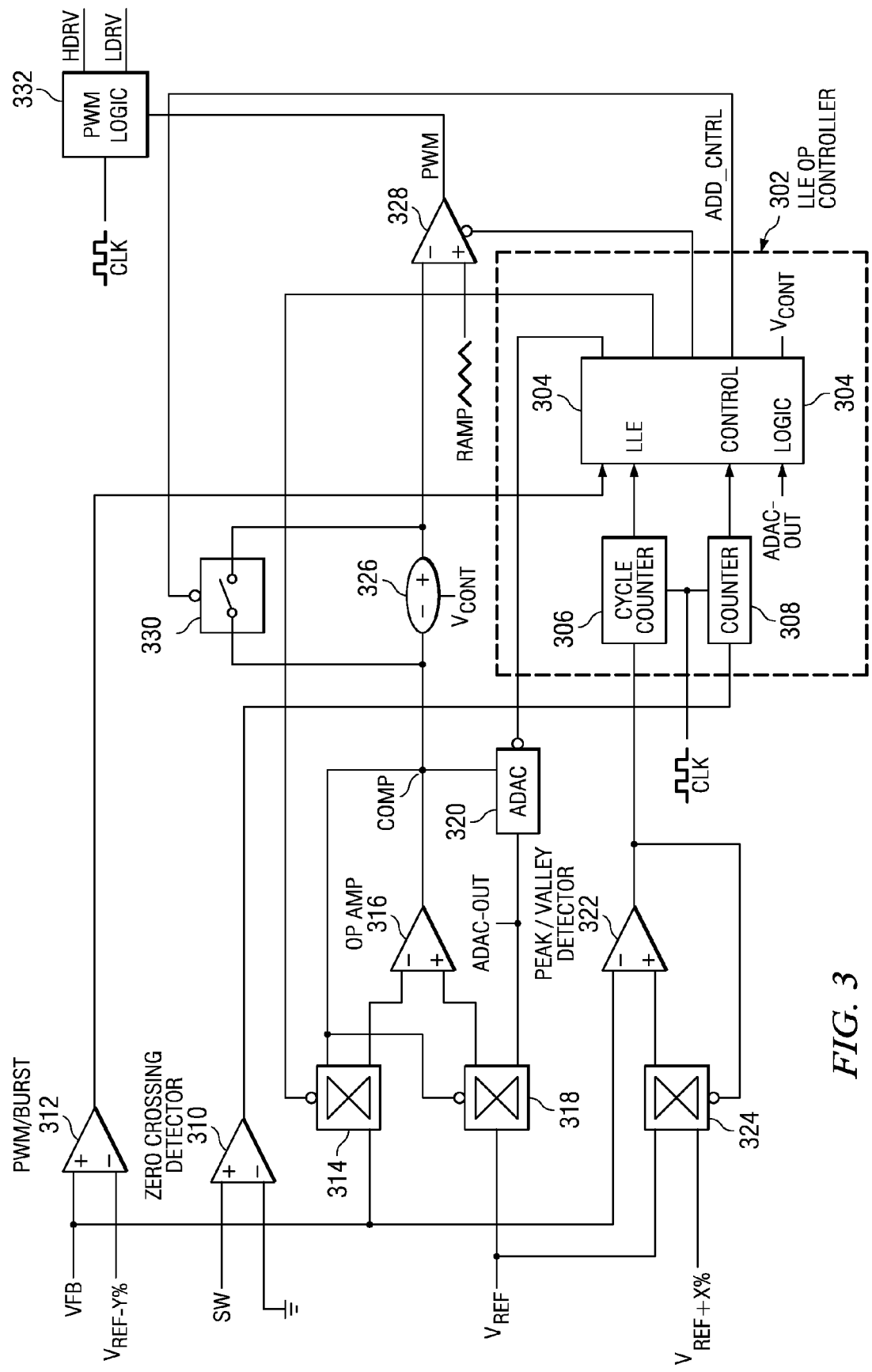
FIG. 3 is a block diagram in accordance with an embodiment of the invention.

Referring now to FIG. 3, components found in the buck controller 102 in accordance with an embodiment of the invention will now be described. The buck controller 102 includes an LLE operations controller 302 that includes an LLE control logic 304, a cycle counter 306 and a zero-crossing counter 308. A respective output of each of the cycle counter 306 and the zero-crossing counter 308 are input to the LLE control logic 304. In addition, each of the cycle counter 306 and the zero-crossing counter 308 receives, as an input, a system clock signal CLK.

A zero-crossing detector 310 has its non-inverting input terminal coupled to the SW node and its inverting input terminal is coupled to ground. An output of the zero-crossing detector 310 is provided as an input to the zero-crossing counter 308.

A PWM/Burst comparator 312 has its non-inverting input terminal coupled to the feedback node VFB and its inverting input terminal is coupled to a reference voltage Vref−Y %. As is known to one of ordinary skill in the art, in a synchronous DC/DC controller a reference voltage Vref is provided or generated in order to control the desired output voltage. Here, the value Vref−Y % is a predetermined value based on the desired tolerance of output voltage operation. In one embodiment, the tolerance Y is set to 2.

A first multiplexer 314 receives, at one input, the feedback node VFB and a second input is connected to an output or output terminal of a control amplifier 316. The output node of the control amplifier 316 is referred to as COMP. An output of the first multiplexer 314 is connected to the inverting input terminal of the control amplifier 316. The first multiplexer 314 is controlled by an output signal from the LLE control logic 304. It should be noted that while the control signal is represented as being connected to a "negative" true signal, this is only to indicate that this is a control input. The embodiments of the present invention are not limited to such devices and may be implemented with "positive" true components.

A second multiplexer 318 has one input connected to receive the reference voltage Vref and another input connected to an output of an Analog-to-Digital/Digital-to-Analog Converter (ADAC) 320. An output of the second multiplexer 318 is connected to the non-inverting input terminal of the control amplifier 316. The second multiplexer 314 is controlled by the same signal coming from the LLE control logic 304 that also controls the first multiplexer 314.

The ADAC 320 has an input connected to the COMP node, i.e., the output of the control amplifier 316. The ADAC 320 is controlled by an output from the LLE control logic 304. In operation, which will be described in more detail below, the ADAC 320 connects the input voltage Vcomp to a digital representation and then converts that digital representation to an analog output signed ADAC_out. The ADAC 320 functions, effectively, as a sample-and-hold device without any of the decay of the signal associated with an analog-only implementation.

A peak/valley detector or comparator 322 has its inverting input terminal coupled to the feedback node VFB and its non-inverting input terminal is coupled to an output of a third multiplexer 324. An input of the third multiplexer 324 is connected to the reference voltage Vref and another input of the third multiplexer 324 is connected to a reference voltage Vref+X %. The value of the constant X is predetermined and, in one embodiment, is set to 2. A control input of the third multiplexer 324 is coupled to an output of the peak/valley detector 322. The output of the peak/valley detector 322 is also connected to an input of the cycle counter 306.

A voltage margin generator 326 has a negative terminal coupled to the output of the control amplifier 316. A positive terminal of the voltage margin generator 326 is connected to an inverting input terminal of a PWM comparator or comparator 328. A value of the voltage margin generator 326 is controlled by a signal Vcont from the LLE control logic 304. A switch 330 is provided in parallel with the voltage margin generator 326 and is controlled by an ADD_CNTRL signal from the LLE control logic 304. Together, the voltage margin generator 326 and the switch generally comprise a voltage margin circuit.

The PWM comparator 328 receives a ramp signal RAMP at its non-inverting input terminal and provides an output signal PWM to an input of a PWM logic module 332. The PWM comparator 328 is also configured to receive an enable/disable control signal from the LLE control logic 304. Operation of the PWM logic module 332 is in accordance with that which is known to one of ordinary skill in the art and the PWM logic module 332 receives, at one input, the clock signal CLK and provides, at its output, the high-side drive signal HDRV and the low-side drive signal LDRV.

As presented above, the DC/DC converter in accordance with embodiments of the present invention operates in two modes: a PWM mode and an LLE mode of operation that includes a burst portion and an idle portion described in more detail below.

In accordance with the PWM mode of operation, the configuration of the components shown in FIG. 3 generally operates as follows. Under control of the LLE control logic 304, the first multiplexer 314 is configured to provide the voltage feedback signal VFB to the inverting input terminal of the control amplifier 316 and the second multiplexer 318 is configured to provide the reference voltage Vref to the non-inverting input terminal of the control amplifier 316. Thus, the ADAC 320 is, effectively, not connected. Further, the LLE control logic 304 closes the switch 330 by operation of the ADD_CNTRL signal, thereby bypassing the voltage margin generator 326 and directly coupling the output of the control amplifier 316 to the inverting input terminal of the PWM comparator 398.

Entrance into the LLE mode of operation generally occurs when a reversed inductor current is first detected. The reverse inductor current is detected by counting a number of zero-current crossing events as detected by the zero-crossing detector 310 in conjunction with the zero-crossing counter 308 and the LLE control logic 304. When the zero-crossing detector 310 senses a reversed inductor current, the counter 308 increments one count. If no reversed inductor current is detected, the counter 308 decrements by one count as controlled by the clock signal. If a predetermined number of counts are summed, for example, three (3), the LLE control logic 304 causes the system to enter into the LLE mode of operation. As above, the LLE mode of operation is a combination of burst and idling.

While in the LLE mode of operation, a number of clock cycles, N_burst, when bursting is counted and a number of clock cycles, N_idle, is counted when idling. Further, while in the LLE mode of operation, the burst count value N_burst is incremented by one for each clock cycle occurring during burst and the burst count N_burst is decremented by one for each clock cycle occurring during idle mode.

In order to remain in the LLE mode of operation the following condition should be met:

N_burst<T_burst OR N_ratio=N_idle:
 N_burst≧T_ratio

Where:
T_burst is a predetermined burst count threshold value; and
T_ratio is a predetermined ratio threshold value.

As above, in the LLE mode of operation, the burst count value N_burst is incremented by one for each clock cycle occurring during burst. If the burst count value N_burst exceeds the threshold value T_burst, the LLE mode of operation is exited and operation returns to the PWM mode of operation. If the burst count N_burst is less than T_burst during bursting, then the burst count N_burst is decremented by one for each clock cycle occurring during subsequent idle modes. If N_burst does not remain less than the threshold T_burst across multiple cycles of bursting and idling, then the system exits from LLE mode back to PWM mode. Alternately, the ratio N_ratio is monitored with respect to the threshold T_ratio.

In one embodiment, the burst threshold T_burst can be set to seven (7) and the ratio threshold T_ratio can be set to one (1). The desired upper limit number of clock cycles when bursting may be selectable where a higher number is implemented in a system with higher load requirements thereby providing for longer bursts.

It should be noted that either the number of cycles during burst, N_burst, or the ratio N_ratio or both may be monitored. It has been observed that a minimum value for the threshold T_ratio is one (1) as, otherwise, the system will exceed the threshold T_burst after only one cycle of burst-idle-burst modes of operation. Further, one of ordinary skill in the art will understand that the inverse ratio of N_burst to N_idle can be monitored with the threshold inverted accordingly.

The LLE mode of operation is a combination of burst and idle. In the burst mode, switching frequency is fixed and is the same frequency as the frequency in the PWM mode of operation. During the idling stage, the high-side and low-side transistors 108, 110, are turned OFF. Peak and valley, i.e., upper and lower voltage limits control is employed, as will be described below in more detail. The output voltage Vout is maintained in a range between a regulation point, i.e., the valley, and a pre-determined amount above that point, i.e., the peak, while in the LLE mode of operation.

In the LLE mode of operation, the control amplifier 316 is configured as a unity gain amplifier by the LLE control logic 304 through the control of the first multiplexer 314. Further, under control of the LLE control logic 304, the second multiplexer 318 is configured to couple the output of the ADAC 320 to the non-inverting input terminal of the control amplifier 316. The node COMP is thus set at a voltage level Vcomp that is measured prior to switching from the PWM mode to the LLE mode. The switch 330 is held open by the ADD_CNTRL signal from the LLE control logic 304 and a margin voltage Vmarg provided by the voltage margin generator 326 is inserted between, i.e., added to, the held output of the control amplifier 316, i.e., Vcomp, and the inverting input terminal of the PWM comparator 328. In other words, a value of (Vcomp+Vmarg) is provided to the PWM comparator 328. An output of the ADAC 320, represented as ADAC_out is provided as an input to the LLE control logic 304. The margin voltage Vmarg provided by the voltage margin generator 326 is proportional to the voltage measured at the node COMP, as implemented by ADAC_out, prior to switching from the PWM mode to the LLE mode of operation.

While in the LLE mode of operation, the added voltage margin Vmarg from the voltage margin generator 326 causes the controller and, therefore, the DC converter, to operate with a generally fixed, but increased, duty ratio that installs additional energy in the output capacitor 116 when in burst mode and to turn OFF both the high-side transistor 108 and the low-side transistor 110 when idling. Adding the margin voltage Vmarg from the voltage margin generator 326 increases the signal level at the inverting input terminal of the PWM comparator 328. Thus, the intersection point with the ramp signal RAMP is increased which increases the duty ratio of the HDRV and LDRV signals.

In burst mode, the third multiplexer 324 is configured to provide the reference voltage Vref+X % to the non-inverting input terminal of the peak/valley detector 322.

By limiting the maximum number of cycles when bursting, or setting a minimum ratio of the number of clock cycles when idling to the number of switching cycles when bursting, energy savings and increased efficiency are provided when automatically switching back to PWM mode as the load increases.

The PWM/burst comparator 312 is provided in the event of a sudden step increase in the load when operating in the LLE mode of operation. Thus, when the PWM/burst comparator 312 detects that the feedback node VFB drops below the reference voltage Vref−Y %, step 208 in FIG. 2, the LLE control logic 304 switches to the PWM mode of operation.

In the burst mode of operation, the peak/valley detector 322 compares the feedback node VFB to the "peak" value, i.e., Vref+X %. When the feedback voltage level VFB exceeds the threshold of Vref+X % the third multiplexer 324 switches and couples the "valley" level, i.e., Vref−Y %, to the non-inverting input terminal of the peak/valley detector 322.

In the idling portion of the LLE mode of operation, the output of the PWM comparator 328 is disabled, thereby turning off the high-side transistor 108 and the low-side transistor 110. The cycle counter 306 and the counter 308 continue to count based on their respective inputs and provide the output information to the LLE control logic 304. In the LLE mode of operation, therefore, bursting and idling then take place in accordance with the above-described conditions.

Figure 4:
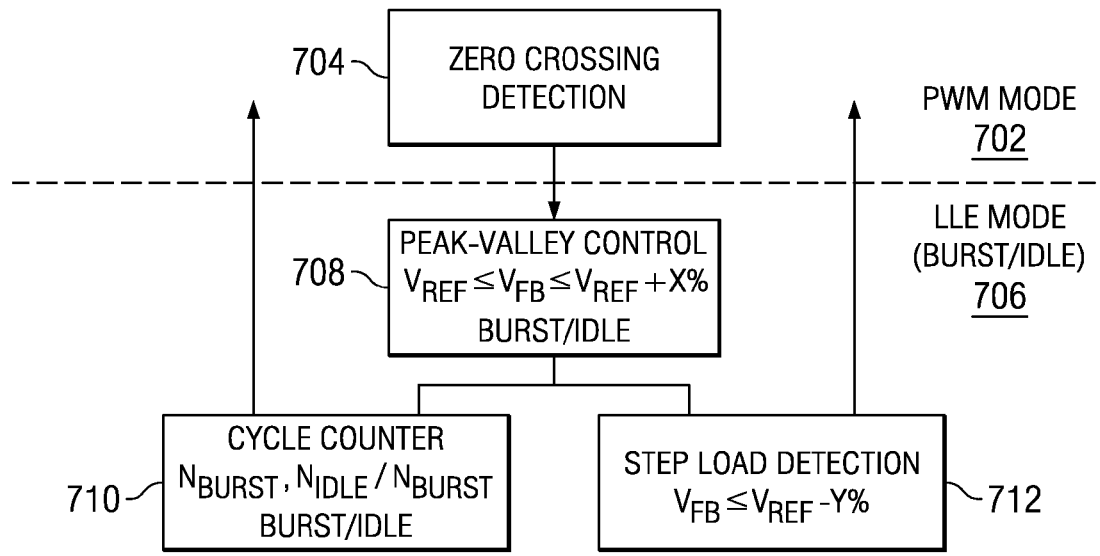
FIG. 4 is a state diagram of operation in accordance with an embodiment of the present invention.

As an additional overview of operation, referring now to FIG. 4, the DC/DC converter starts in a PWM mode of operation 702. In state 704, if zero-crossing is detected, i.e., a predetermined number of zero-crossings over a period of time indicating a light-load condition is now occurring, then the mode of operation moves to the LLE mode or state 706. As above, in the LLE mode of operation 706, there is peak/valley control 708 maintaining the feedback node VFB between the reference voltage Vref, i.e., the valley, and the "peak" value Vref+X % as maintained by alternating between the burst and idle modes of operation.

In accordance with one or more embodiments of the present invention, the mode of operation will move from the LLE mode 706 to the PWM mode 702 if, block 710, the number of burst cycles N_burst exceeds the threshold T_burst or the ratio of the number of idle cycles N_idle to the number of burst cycles N_burst falls below the predetermined threshold T_ratio or if, block 712, there is a step increase in the amount of load where the feedback node VFB≦Vref−Y %, i.e., a lower threshold voltage.

Figure 5:
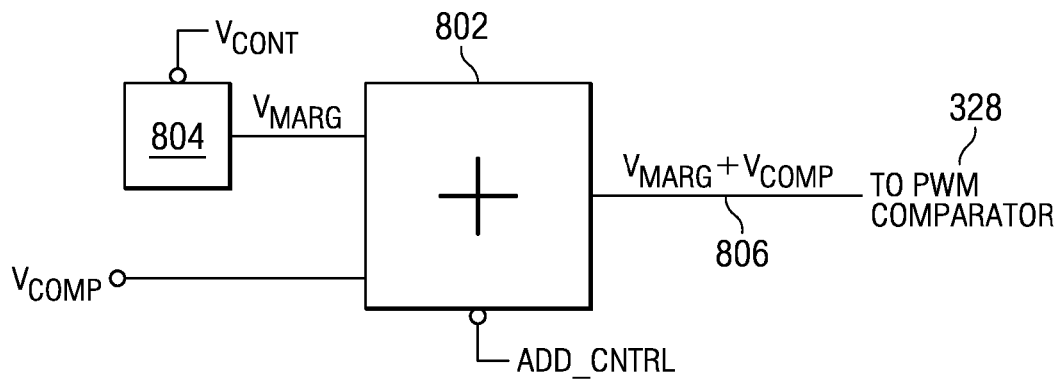
FIG. 5 is a block diagram of a voltage margin adder circuit, which can be used as an alternative for the voltage margin circuit.

Referring now to FIG. 5, an alternate circuit for adding the margin voltage Vmarg to the voltage Vcomp from the amplifier 316 will be described. In FIG. 3, a voltage margin generator 326 is in series with the output of the amplifier 316 and the inverting input terminal of the PWM comparator 328 along with a switch 330 in parallel with the voltage margin generator 326. Alternately, as shown in FIG. 5, a voltage adder 802 has two inputs to receive, respectively, voltages that are added together and are presented on an output of the voltage adder 802. A voltage margin generator 804 is provided and is controlled by the LLE control logic 304 via the signal Vcont, similar to the "in-line" configuration shown in FIG. 3, in order to set the output voltage Vmarg. The voltage adder 802 is positioned between the COMP node and the inverting input terminal of the PWM comparator 328. Further, the voltage adder 802 is under control of the LLE control logic 304 via the ADD_CNTRL signal to provide a voltage at the output of the voltage adder 802 equal to (Vmarg+Vcomp) at its output 806.

In operation, the voltage adder 802 would be positioned in place of the voltage margin generator 326 as shown in FIG. 3 and the switch 330 would not be used. Operation would proceed as has been described above with the margin voltage Vmarg being set by the LLE control logic 304 and the voltage adder 802 also being under control of the LLE control logic 304. The voltage adder 802 can also be configured to implement the foregoing methods in any one of a number of ways. In the PWM mode of operation where, effectively, the output of the amplifier 316 is directly coupled to the non-inverting input terminal of the PWM comparator 328, the LLE control logic 304 may either configure the voltage adder 802 to not add the margin voltage Vmarg to the voltage Vcomp or, alternatively, set the margin voltage Vmarg to, effectively, zero and, therefore, "pass-through" the unchanged output voltage Vcomp.

Advantageously, there is virtually no voltage transient on the output voltage when switching from the PWM mode of operation to the LLE mode of operation. Further, there is lower voltage transient on the output voltage when exiting out from the LLE mode of operation back to the PWM mode of operation due to an increase in load. Additionally, with incorporation voltage feed-forward, greater immunity is generally provided to input voltage transients when operating in the LLE mode of operation. In an embodiment of the invention, logic circuitry is provided to calculate the desired voltage margin as provided by the voltage generator 326 in the burst mode of operation thus simplifying the design and easing implementation.

Having thus described several features of at least an embodiment of the invention, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of operating a synchronous DC/DC converter, the method comprising:
   operating in a light-load mode of operation by alternately operating in a burst mode and an idle mode;
   incrementing a burst count value by one for each clock cycle during burst mode;
   comparing the burst count value to a predetermined burst threshold value; and
   ceasing operation of the synchronous DC/DC converter in the light-load mode of operation if the burst threshold value is less than the burst count value.

2. The method of claim 1, wherein the method further comprises the step of decrementing the burst count value by one for each clock cycle during idle mode.

3. The method of claim 1, wherein the method further comprises the steps of:
   incrementing an idle count value by one for each clock cycle during idle mode;
   comparing a ratio of the idle count value to the burst count value to a predetermined threshold; and
   ceasing operation of the synchronous DC/DC converter in the light-load mode of operation if the ratio is less than the predetermined threshold.

4. The method of claim 1, wherein the burst threshold value is 7.

5. A synchronous DC/DC controller comprising:
   an amplifier having a plurality of input terminals, and an output terminal;
   an analog-to-digital-to-analog converter (ADAC) that is coupled to the output terminal of the amplifier;
   a first multiplexer that is coupled to the output terminal of the amplifier, a feedback node, and at least one of the input terminals of the amplifier;
   a second multiplexer that is coupled the ADAC, a reference node, and at least one of the input terminals of the amplifier;
   a voltage margin circuit coupled to the output terminal of the amplifier;
   a comparator that is coupled to the voltage margin circuit and that compares an output signal from the voltage margin circuit to a reference voltage; and
   a Light-load Efficiency (LLE) controller coupled to the first and second multiplexers, the ADAC, and the voltage margin circuit, wherein the LLE controller provides control signals to the first and the second multiplexers to set the amplifier as a unity gain amplifier during an LLE mode of operation.

6. The synchronous DC/DC controller of claim 5, wherein the voltage margin circuit further comprises:
   a voltage margin generator that is coupled to the output terminal of the amplifier; and
   a switch coupled in parallel with the voltage margin generator.

7. The synchronous DC/DC converter of claim 5, wherein the voltage margin circuit further comprises:
   an adder that is coupled to the output terminal of the amplifier; and
   a voltage margin generator that is coupled to the adder.

8. The synchronous DC/DC controller of claim 5, wherein the controller further comprises detection circuit that is adapted to detect reverse inductor currents.

9. The synchronous DC/DC controller of claim 8, wherein the LLE controller further comprises:
   a counter that is coupled to the detection circuit, wherein the counter maintains a burst count; and
   LLE control logic that is coupled to the counter, wherein the LLE control logic provides the control signals to the first and second multiplexers.

10. The synchronous DC/DC controller of claim 8, wherein the detection circuitry further comprises:
    a zero-crossing detection that is adapted to detect reverse inductor currents; and
    a peak/valley detector that is coupled to the feedback node.

11. The synchronous DC/DC controller of claim 5, wherein the controller further comprises a PWM logic that is coupled to the comparator.

12. An apparatus comprising:
    a bridge coupled between an input voltage and ground;
    an inductor having a first and a second terminal, wherein the inductor is coupled to the bridge at is first terminal and an output node at its second terminal;
    a capacitor coupled between the output terminal and ground;
    a feedback network coupled to the output node; and
    a controller coupled to the feedback network and to the bridge, wherein the controller provides driving signals to the bridge, and wherein the controller includes:
        an amplifier having a plurality of input terminals, and an output terminal;
        an ADAC that is coupled to the output terminal of the amplifier;
        a first multiplexer that is coupled to the output terminal of the amplifier, a feedback node, and at least one of the input terminals of the amplifier;
        a second multiplexer that is coupled the ADAC, a reference node, and at least one of the input terminals of the amplifier;
        a voltage margin circuit coupled to the output terminal of the amplifier;
        a comparator that is coupled to the voltage margin circuit and that compares an output signal from the voltage margin circuit to a reference voltage; and
        a Light-load Efficiency (LLE) controller coupled to the first and second multiplexers, the ADAC, and the voltage margin circuit, wherein the LLE controller provides control signals to the first and the second multiplexers to set the amplifier as a unity gain amplifier during an LLE mode of operation.

13. The apparatus of claim 12, wherein the voltage margin circuit further comprises:
   a voltage margin generator that is coupled to the output terminal of the amplifier; and
   a switch coupled in parallel with the voltage margin generator.

14. The apparatus of claim 12, wherein the voltage margin circuit further comprises:
   an adder that is coupled to the output terminal of the amplifier; and
   a voltage margin generator that is coupled to the adder.

15. The apparatus of claim 12, wherein the controller further comprises a detection circuit that is adapted to detect reverse inductor currents.

16. The apparatus of claim 15, wherein the LLE controller further comprises:
   a counter that is coupled to the detection circuit, wherein the counter maintains a burst count; and
   LLE control logic that is coupled to the counter, wherein the LLE control logic provides the control signals to the first and second multiplexers.

17. The apparatus of claim 15, wherein the detection circuitry further comprises:
   a zero-crossing detection that is adapted to detect reverse inductor currents; and
   a peak/valley detector that is coupled to the feedback node.

18. The apparatus of claim 12, wherein the controller further comprises a PWM logic that is coupled to the comparator.

* * * * *